(12) United States Patent
Kawano et al.

(10) Patent No.: US 7,833,607 B2
(45) Date of Patent: Nov. 16, 2010

(54) LAMINATED FILM, FILTER FOR DISPLAY, AND DISPLAY

(75) Inventors: Mahito Kawano, Kochi (JP); Kiyoshige Maeda, Omihackiman (JP)

(73) Assignee: Toray Industries, Inc. (JP)

( * ) Notice: Subject to any disclaimer, the term of this patent is extended or adjusted under 35 U.S.C. 154(b) by 631 days.

(21) Appl. No.: 10/509,269

(22) PCT Filed: Mar. 28, 2003

(86) PCT No.: PCT/JP03/03968

§ 371 (c)(1),
(2), (4) Date: Sep. 27, 2004

(87) PCT Pub. No.: WO03/083524

PCT Pub. Date: Oct. 9, 2003

(65) Prior Publication Data

US 2005/0221054 A1    Oct. 6, 2005

(30) Foreign Application Priority Data

Mar. 29, 2002 (JP) .............................. 2002-096917
Jul. 11, 2002 (JP) .............................. 2002-202655

(51) Int. Cl.
*G02B 1/10* (2006.01)
*B32B 1/00* (2006.01)
(52) U.S. Cl. ..................... 428/143; 359/585
(58) Field of Classification Search ............... 428/141, 428/143; 359/585
See application file for complete search history.

(56) References Cited

U.S. PATENT DOCUMENTS

| 5,886,819 | A | * | 3/1999 | Murata et al. .............. 359/483 |
| 5,910,356 | A | | 6/1999 | Ishikawa et al. |
| 6,051,665 | A | * | 4/2000 | Yamada et al. ............. 525/477 |
| 6,064,524 | A | * | 5/2000 | Oka et al. ................... 359/582 |
| 6,716,513 | B1 | * | 4/2004 | Hasuo et al. ................ 428/141 |

FOREIGN PATENT DOCUMENTS

| JP | 05-341103 A | 12/1993 |
| JP | 11-130715 A | 5/1999 |
| JP | 2000-017099 A | 1/2000 |
| JP | 2001-228303 A | 8/2001 |
| JP | 2001-233611 | 8/2001 |
| JP | 2002-36457 | * 2/2002 |
| JP | 2002-036457 A | 2/2002 |
| JP | 2002-079616 | 3/2002 |
| JP | 2002-082205 A | 3/2002 |

OTHER PUBLICATIONS

Machine Translation of JP 2002-36457.*

* cited by examiner

*Primary Examiner*—Alicia Chevalier
(74) *Attorney, Agent, or Firm*—DLA Piper LLP (US)

(57) ABSTRACT

A multilayer film includes a substrate film (a), a hard coat layer (b) containing a (meth)acrylate compound, an electrically conductive layer (c) containing electrically conductive particles, and a resin layer (d) containing a fluorine compound, those layers being disposed on at least one face of the substrate film (a). The resin layer (d) has fine irregularities on the surface and an arithmetic average surface roughness Ra ranging from 0.003 μm to 0.025 μm and the surface of the resin layer (d) of the multilayer film has a reflectance of less than 2%. The display filter and the display each include the multilayer film.

16 Claims, 2 Drawing Sheets

LAMINATED FILM, FILTER FOR DISPLAY, AND DISPLAY

TECHNICAL FIELD

This disclosure relates to antireflection films for screens of displays such as cathode ray tubes (CRTs), liquid crystal devices (LCDs), and plasma display panels (PDPs). The disclosure particularly relates to a highly transparent multilayer film with high scratch resistance and a display filter.

BACKGROUND

In screens of displays such as televisions and computer monitors, there is a problem in that displayed images are illegible because light emitted from external light sources such as the sun and fluorescent tubes is reflected on the screen surfaces. In order to solve this problem, the following techniques have been proposed as disclosed in Japanese Unexamined Patent Application Publication Nos. 12-329905 and 13-264508: a technique for irregularly reflecting external light on an irregular surface and a technique for preventing light reflection using a structure including thin-films with low refractive index and thin-films with high refractive index, those thin-films being alternately stacked.

However, the technique for irregularly reflecting external light has another problem in that an image on a display appears blurred. Japanese Unexamined Patent Application Publication Nos. 4-355401, 11-92750, and 11-174971 disclose techniques for providing fluorine compounds having low refractive index on surface layers. Since the fluorine compounds have low surface hardness and therefore have no scratch resistance, those techniques have a problem in that the surface layers are damaged during the assembling of displays or during the cleaning of surfaces and images therefore appear blurred.

It could therefore be advantageous to provide a multilayer film that has high scratch resistance enhanced by increasing the surface hardness of a low-refractive index layer, low reflectance, and high transparency and is useful in preventing reflection. It could also be advantageous to provide a method for manufacturing the film.

Our multilayer film principally has the configuration below. The multilayer film includes a substrate film (a), a hard coat layer (b) containing a (meth)acrylate compound, an electrically conductive layer (c) containing electrically conductive particles, and a resin layer (d) containing a fluorine compound, those layers being disposed on at least one face of the substrate film (a). The resin layer (d) has fine irregularities on the surface and an arithmetic average surface roughness Ra ranging from 0.003 to 0.025 μm and the surface of the resin layer (d) of the multilayer film has a reflectance of less than 2%.

A display film principally has the configuration below. The display film includes the multilayer film, a sticky or adhesive layer placed on a face of the multilayer film that is opposite to the resin layer (d), and a protective film joined to the sticky or adhesive layer.

A display filter principally has the configuration below. The display filter includes the multilayer film joined to the front face of a display with the sticky or adhesive layer placed therebetween.

A front protector panel for plasma display panels principally has the configuration below. The plasma display panel front protector panel includes the multilayer film joined to the front face of a front panel for plasma display panels with the sticky or adhesive layer placed therebetween.

Figure 1:
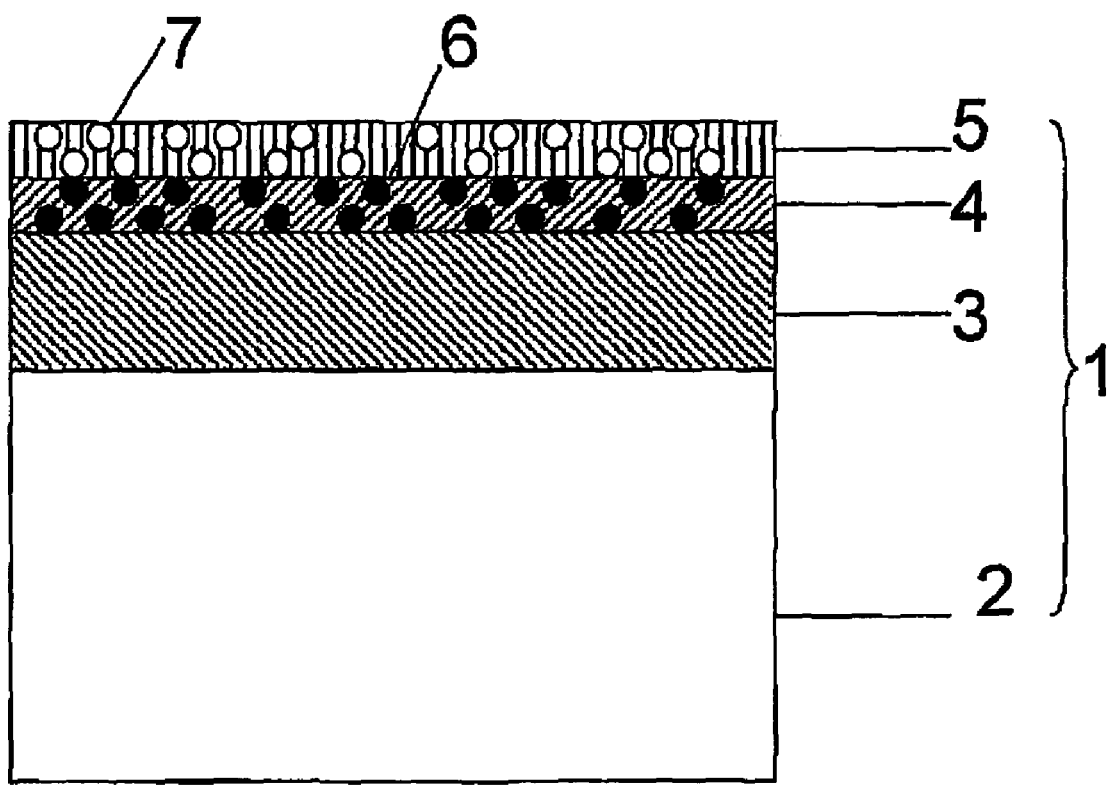
FIG. 1 is a schematic plan view showing a multilayer structure of a multilayer film.

Reference numeral 1 represents the multilayer film, reference numeral 2 represents a substrate film, reference numeral 3 represents a hard coat layer, reference numeral 4 represents an electrically conductive layer, reference numeral 5 represents a resin layer, reference numeral 6 represents an electrically conductive particles, reference numeral 7 represents a fine silica particles, reference numeral 8 represents a front protector panel for plasma display panels, reference numeral 9 represents a glass sheet with an electromagnetic wave-shielding function, and reference numeral 10 represents a sticky layer.

DETAILED DESCRIPTION

A multilayer film includes a substrate film (a), a hard coat layer (b) containing a (meth)acrylate compound, an electrically conductive layer (c) containing electrically conductive particles, and a resin layer (d) containing a fluorine compound, those layers being disposed on at least one face of the substrate film (a).

In the multilayer film, the following conditions and configurations are preferable: (1) the resin layer (d) has irregularities on the surface and an arithmetic average surface roughness Ra ranging from 0.003 to 0.025 μm and the surface of the resin layer (d) of the multilayer film has a reflectance of less than 2%; (2) the multilayer film has a haze of less than 3%; (3) the substrate film (a) contains a polymer containing one selected from the group consisting of an ester, an olefin, an acetate, styrene, a carbonate, a sulfone, ether ethyl ketone, an imide, fluorine, a nylon, an acrylate, and an aliphatic olefin; (4) the substrate film (a) contains a polymer containing one selected from the group consisting of the ester, the acetate, and the acrylate; (5) the electrically conductive layer (c) has a thickness of 0.01 to 1.0 μm; (6) the electrically conductive layer (c) has a conductive particle content of 70% to 90% by weight; (7) the resin layer (d) contains a composition containing fine silica particles with a particle size of 0.001 to 0.2 μm; (8) the fine silica particles contain a composition having two or more particle size distributions; (9) the resin layer (d) contains a composition that contains a silane coupling agent represented by the formula $R(1)_a R(2)_b SiX_{4-(a+b)}$, a hydrolysate of the agent, or a product obtained by subjecting the agent to reaction, wherein R(1) and R(2) independently represent a hydrocarbon group having an alkyl group, an alkenyl group, an allyl group, a halogen group, an epoxy group, an amino group, a mercapto group, a methacryloxy group, or a cyano group, X represents a hydrolyzable substituent selected from the group consisting of an alkoxyl group, an alkoxyalkoxy group, a halogen group, and an acyloxy group, a and b are independently equal to zero, one, or two, and the sum of a and b is equal to one, two, or three; (10) the fluorine compound contained in the resin layer (d) contains a composition having an alkoxysilyl group; (11) a display film includes the multilayer film described above; (12) a display includes the display film; (13) a display filter includes the multilayer film; (14) a front protector panel for plasma display panels includes the multilayer film; and (15) a plasma display includes the front protector panel for plasma display panels. According to those conditions and conditions, advantages can be achieved.

We will now further describe selected aspects in detail.

When the substrate film (a) is used as a component (hereinafter referred to as a display component) of a display unit, the substrate film (a) preferably has high transmittance and low haze. For example, the transmittance is preferably 40% or more and more preferably 60% or more at a wavelength of 400 to 800 μm, and the haze is preferably 5% or less and more preferably 3% or less. If such a display component does not satisfy one or both of those conditions, a sharp image cannot be achieved. In order to achieve an advantage, the upper limit of the transmittance is about 99.5% and the lower limit of the haze is about 0.1%, in a feasible range.

A resin material for forming the substrate film (a) is not particularly limited and may be one selected from resin materials for manufacturing known plastic substrate films. Examples of the resin material for forming the substrate film (a) include a polymer and copolymer containing one selected from the group consisting of an ester, ethylene, propylene, a diacetate, a triacetate, styrene, a carbonate, methylpentene, a sulfone, ether ethyl ketone, an imide, fluorine, a nylon, an acrylate, and an aliphatic olefin.

The following polymer or copolymer is preferable among those resins: a polymer or copolymer containing one selected from the group consisting of a polyester such as polyethylene terephthalate, an acetate cellulose such as triacetyl cellulose, and an acrylate polymer such as polymethylmethacrylate. This is because the polymer or copolymer has high transparency and strength and a uniform thickness can be achieved. In particular, the substrate film (a) preferably contains a polymer containing such an ester in view of transparency, haze, and mechanical properties.

Examples of a polyester resin include polyethylene terephthalate, polyethylene 2,6-naphthalate, polybutylene terephthalate, and polyethylene-α,β-bis(2-chlorophenoxy)ethane-4,4'-dicarboxylate. Those polyesters may contain 20% or less of another dicarboxylic acid unit and/or diol unit incorporated by copolymerization on a mole basis. Polyethylene terephthalate is particularly preferable in comprehensive consideration of quality and cost.

Those resin components may be used alone or in combination.

The thickness of the substrate film (a) is not particularly limited and the substrate film (a) usually has a thickness of five to 800 μm and preferably ten to 250 μm in view of transparency, haze, and mechanical properties. The substrate film (a) may include two or more films laminated to each other by a known method.

Before the hard coat layer (b) is provided on the substrate film (a), the substrate film (a) may be surface-treated by any one of various treating methods (for example, corona discharge treatment, glow discharge treatment, flame treatment, etching treatment, and surface roughening treatment). In order to enhance the adhesion, the following coating functioning as an undercoat may be provided on a surface of the substrate film (a): for example, a polyurethane coating, a polyester coating, a polyester acrylate coating, a polyurethane acrylate coating, a polyepoxy acrylate coating, or a coating containing a titanate compound. The hard coat layer (b) may be then provided on the coating. When the substrate film (a) is coated with a composition containing a crosslinking agent and a copolymer prepared by the graft-polymerization of an acrylic compound and a polyester resin having a hydrophilic group, the resulting substrate film (a) has high adhesion and endurance properties such as heat resistance and water resistance; hence, such a composition is particularly preferable for the substrate film (a).

It is essential that the hard coat layer (b) be placed on the substrate film (a) and contain a (meth)acrylate. The (meth)acrylate is radically polymerized by the application of activating light and a layer containing the (meth)acrylate has high solvent resistance and hardness. Examples of the (meth)acrylate include monofunctional acrylates such as methyl (meth)acrylate, n-butyl (meth)acrylate, polyester (meth)acrylate, lauryl (meth)acrylate, hydroxyethyl (meth)acrylate, and hydroxypropyl (meth)acrylate. Furthermore, examples of the (meth)acrylate include a multifunctional (meth)acrylate having two or more (meth)acryloyl groups, and such a (meth)acrylate is particularly preferable because high solvent resistance is achieved. Examples of the multifunctional (meth)acrylate include pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, and trimethylolpropane tri(meth)acrylate. Those monomers may be used alone or in combination.

In order to enhance the hardness of the hard coat layer (b), the resin component for forming the hard coat layer (b) of the present invention may further contain inorganic particles containing alkyl silicate, a hydrolysate of alkyl silicate, colloidal silica, dry-process silica, wet-process silica, or titanium oxide; fine colloidal silica particles; or other particles.

The thickness of the hard coat layer (b) is appropriately determined depending on uses and the hard coat layer (b) usually has a thickness of one to 50 μm and preferably two to 30 μm. When the thickness of the hard coat layer (b) is less than two μm, the surface hardness is insufficient and the hard coat layer (b) is therefore readily damaged; hence, such a thickness is not preferable. In contrast, when the thickness of the hard coat layer (b) is more than 50 μm, the hard coat layer (b) has low transparency and high haze, is brittle after it is cured, and is apt to crack when the film is bent; hence, such a thickness is not preferable.

It is essential that the electrically conductive layer (c) be placed on the hard coat layer (b) and contain electrically conductive particles (B) and a binder component (A).

Examples of the electrically conductive particles used herein include fine metal particles and fine metal oxide particles. The fine metal oxide particles are particularly preferable because of the high transparency. Preferable examples of the fine metal oxide particles include antimony tin oxide (ATO) particles, antimony zinc oxide particles, indium tin oxide (ITO) particles, zinc oxide-aluminum oxide particles, and antimony oxide particles. The indium tin oxide (ITO) particles and the antimony tin oxide (ATO) particles are particularly preferable.

The particles having electrical conductivity preferably have an average primary particle size of 0.5 μm or less, more preferably 0.001 to 0.3 μm, and further more preferably 0.005 to 0.2 μm, the average primary particle size being defined as the spherical size determined by the BET method. When the average particle size is above the range described above, a coating (the electrically conductive layer (c)) has low transparency. When the average particle size is below the above range, the particles are apt to aggregate; hence, the formed coating (the electrically conductive layer (c)) has high haze. Therefore, when the average particle size is outside the above range, a desired haze cannot be substantially achieved.

The binder component (A) contained in the electrically conductive layer (c) contains a (meth)acrylate. The (meth)acrylate is preferable in that the (meth)acrylate is radically polymerized by the application of activating light and a layer containing the (meth)acrylate has high solvent resistance and hardness. Furthermore, a multifunctional (meth)acrylate having two or more (meth)acryloyl groups is particularly preferable in the present invention because the solvent resistance is high. Examples of the multifunctional (meth)acrylate include trifunctional (meth)acrylates such as pentaerythritol tri (meth)acrylate, trimethylolpropane tri(meth)acrylate, glycerol tri(meth)acrylate, ethylene-modified trimethylolpropane tri(meth)acrylate, and tris(2-hydroxyethyl) isocyanurate tri (meth)acrylate; tetrafunctional (meth)acrylates such as pentaerythritol tetra(meth)acrylate, dipentaerythritol penta (meth)acrylate, and dipentaerythritol hexa(meth)acrylate; and other (meth)acrylates.

In order to enhance particle dispersion, the binder component (A) contained in the electrically conductive layer (c) may contain a (meth)acrylate with an acidic functional group such as a carboxyl group, a phosphoric group, or a sulfonic group. Examples of a monomer with such an acidic functional group include unsaturated carboxylic acids such as acrylic acid, methacrylic acid, crotonic acid, 2-methacryloyloxyethyl succinic acid, and 2-methacryloyloxyethyl phthalic acid; (meth) acrylate phosphates such as mono(2-(meth)acryloyl oxyethyl) acid phosphate and diphenyl-2-(meth)acryloyl oxyethyl phosphate; and 2-sulfoester (meth)acrylate. Furthermore, other (meth)acrylates having a polar bond such as an amide bond, a urethane bond, or an ether bond may be used. A resin, such as a urethane (meth)acrylate oligomer, having a urethane bond is particularly preferable because such a resin has high polarity and is advantageous in enhancing particle dispersion.

To cure the binder component used to form the hard coat layer (b) and electrically conductive layer (c), an initiator may be used. The initiator is used to initiate or promote the radical, anionic, or cationic polymerization and/or cross-linking reaction of the binder component and various well-known photopolymerization initiators can be used. Examples of the initiator include sulfides such as sodium methyldithiocarbamate sulfide, diphenyl monosulfide, dibenzothiazolyl monosulfide, and dibenzothiazolyl disulfide; thioxanthones such as thioxanthone, 2-ethylthioxanthone, 2-chlorothioxanthone, and 2,4-diethylthioxanthone; azo compounds such as hydrazone and azobisisobutyronitrile; diazo compounds such as benzene diazonium; aromatic carbonyl compounds such as benzoin, benzoin methyl ether, benzoin ethyl ether, benzophenone, dimethylamino benzophenone, Michler's ketone, benzylanthraquinone, t-butylanthraquinone, 2-methylanthraquinone, 2-ethylanthraquinone, 2-aminoanthraquinone, and 2-chloroanthraquinone; dialkylaminobenzoates such as methyl p-dimethylaminobenzoate, ethyl p-dimethylaminobenzoate, butyl D-dimethylaminobenzoate, and isopropyl p-diethylaminobenzoate; peroxides such as benzoyl peroxide, di-t-butyl peroxide, dicumyl peroxide, cumene hydroperoxide; acridines such as 9-phenylacridine, 9-p-methoxyphenyl acridine, 9-acetylaminoacridine, benzacridine; phenazines such as 9,10-dimethyl banzophenazine, 9-methyl banzophenazine, 10-methoxy banzophenazine; quinoxalines such as 6,4',4"-trimethoxy-2,3-diphenyl quinoxaline; a 2,4,5-tri$_p$henylimidazolyl dimer; 2-nitrofluorene; 2,4,6-triphenylpyrylium tetrafluoroborate; 2,4,6-tris(trichloromethyl)-1,- 3,5 -triazine; 3,3'-carbonylbiscoumarin; thio Michler's ketone; 2,4,6-trimethyl benzoyl diphenyl phosphine oxide; oligo (2-hydroxy-2-methyl-1-(4-(1-methylvinyl)phenyl) propanone); and 2-benzyl-2-dimethylamino-1-(4-morpholinophenyl) butanone.

To prevent the sensitivity of the initiator from being decreased due to oxygen inhibition, an amine compound may be used together with the photopolymerization initiator when the hard coat layer (b) and the electrically conductive layer (c) are formed. The amine compound is not particularly limited and any aliphatic compound and any aromatic amine compound that are non-volatile can be used. For example, triethanolamine and methyl diethanolamine are preferable.

For the composition of the electrically conductive layer (c), the ratio ((A)/(B)) of the binder component (A) to the particles (B) ranges from 10:90 to 30:70 and preferably 15:85 to 25:75 on a weight basis. When the amount of the particles (B) is below the range, an obtained layer has low electrical conductivity although the layer has high transparency. In contrast, when the amount thereof is above the range, the layer has unsatisfactory physical and/or chemical properties, which is not preferable. The amount of the photopolymerization initiator is usually 0.1 to 20 parts and preferably 1.0 to 15.0 parts with respect to 100 parts of the binder component (A) on a weight basis. When the amount of the initiator is less than 0.1 parts by weight, the rate of the photopolymerization is low; hence, light must be applied to the layer for a long time in order to achieve a satisfactory hardness and scratch resistance and the layer cannot be sufficiently cured in some cases. In contrast, when the amount thereof is more than 20 parts by weight, the layer has low electrical conductivity, abrasion resistance, weather resistance, and other properties.

Essential components of the electrically conductive layer (c) include the binder component (A), the particles (B), and the photopolymerization initiator as described above. The electrically conductive layer (c) may further contain various additives such as a polymerization inhibitor, a curing catalyst, an oxidation inhibitor, a dispersing agent, a leveling agent, and a silane coupling agent according to needs.

To enhance the electrical conductivity, the electrically . conductive layer (c) may further contain an electrically conductive polymer such as polypyrrol or polyaniline and/or a metal organic compound such as metal alcoholate or a chelate compound. In order to enhance the surface hardness, the electrically conductive layer (c) may further contain inorganic particles containing alkyl silicate, a hydrolysate of alkyl silicate, colloidal silica, dry-process silica, wet-process silica, or titanium oxide; fine colloidal silica particles; or other particles.

In order to allow the electrically conductive layer (c) of the present invention to exert desired antistatic properties, the electrically conductive layer (c) preferably has a surface resistivity of $1 \times 10^{11}$ ohm per square or less and more preferably $1 \times 10^{10}$ ohm per square or less.

The electrically conductive layer (c) of the present invention preferably has a transmittance of 40% or more and more preferably 60% or more in view of sharpness and transparency.

It is essential that the resin layer (d) be placed on the electrically conductive layer (c) and contain a fluorine compound. The fluorine compound used in the present invention is preferably cross-linked with heat or ionizing radiation. Examples of the cross-linkable fluorine compound include a fluorine-containing monomer with an unsaturated group, a fluorine polymer with a cross-linkable group, and a fluorine-containing copolymer containing a fluorine-containing monomer and a monomer for forming such a cross-linkable group.

In particular, a fluorine-containing copolymer having a vinyl ether in principal chain is preferable. The fluorine-containing copolymer preferably has a fluorine-containing olefin chain that has a fluorine content of 30% by weight or more and a number-average molecular weight of 500 or more and more preferably 5,000 or more in terms of polystyrene.

The fluorine-containing copolymer is prepared by subjecting a curable composition containing a fluorine-containing compound and a vinyl ether-containing compound to polymerization. In particular, the fluorine-containing copolymer can be prepared by subjecting a fluorine-containing olefin compound or the following composition to polymerization: a curable composition containing the fluorine-containing olefin compound and a vinyl ether-containing compound and further containing a reactive emulsifier according to needs.

The curable composition for forming the fluorine-containing copolymer preferably contains such a reactive emulsifier. When the reactive emulsifier is used, a coating solution containing the fluorine-containing copolymer has good coating and leveling properties. Preferable examples of the reactive emulsifier include a nonionic reactive emulsifier in particular.

The fluorine-containing copolymer contained in the resin layer (d) contains 20% to 70% of a repeating unit derived from the fluorine-containing olefin compound, preferably 25% to 65%, and more preferably 30% to 60% on a mole basis. When the content of the repeating unit derived therefrom is less than 20%, the fluorine-containing copolymer has low fluorine content and the resin layer (d) cannot therefore have sufficiently low refractive index. In contrast, when the content of the repeating unit is more than 70%, the following problems arise: the coating solution is not uniform and a uniform coating cannot therefore be formed and furthermore, the coating solution has low transparency and adhesion to a substrate.

The fluorine-containing copolymer contains 10% to 70% of a repeating unit derived from the vinyl ether-containing compound, preferably 15% to 65%, and more preferably 30% to 60% on a mole basis. When the content of the repeating unit derived therefrom is less than 10%, the coating solution has low uniformity and a uniform coating cannot therefore be formed. In contrast, when the content of the repeating unit is more than 70%, the resin layer (d) has inferior optical properties, that is, low transparency and high reflectance, which is not preferable.

Preferable examples of the vinyl ether-containing compound include a monomer with a reactive functional group such as a hydroxyl group or an epoxy group. A coating solution containing a curable resin composition prepared using such a monomer is useful in forming a cured layer with high strength. The content of the monomer with such a hydroxyl or epoxy group in total monomers ranges from 0% to 20%, preferably 1% to 20%, more preferably 3% to 15% on a mole basis. When the content is more than 20% by mole, the resin layer (d) has inferior optical properties and a cured layer is brittle.

In the fluorine-containing copolymer containing the reactive emulsifier, the content of a repeating unit derived from the reactive emulsifier is usually 0% to 10% and preferably 0.1% to 5% on a mole basis. When the content is more than 10% by mole, the resin layer (d) is sticky and therefore hard to handle and a coating agent has low moisture resistance, which is not preferable.

The resin layer (d) preferably further contains a cross-linkable compound in addition to the fluorine-containing copolymer. Such a cross-linkable compound is useful in achieving desired curing properties and/or useful in enhancing curing properties.

Examples of the cross-linkable compound include various amino compounds; various hydroxyl group-containing compounds such as pentaerythritol, polyphenols, glycols, alkyl silicates, and hydrolysates of such alkyl silicates; and other compounds. An amino compound suitable for the cross-linkable compound has two or more amino groups, such as a hydroxyalkylamino group and/or an alkoxyalkylamino group, reactable with a hydroxyl or epoxy group contained in the fluorine compound. Examples of the amino compound include a melamine compound, a urea compound, a benzoguanamine compound, and a glycol lauryl compound. The melamine compound is widely known as a compound having a triazine ring and a nitrogen atom bonded thereto. Examples of the melamine compound include melamine, alkylated melamine, methylol melamine, and alkoxylated methylmelamine. A melamine compound that has a methylol group and an alkoxymethyl group or has at least two methylol groups and/or alkoxymethyl groups is preferable. In particular, methylol melamine prepared by allowing melamine to react with formic aldehyde under basic conditions, alkoxylated melamine, and derivatives thereof are preferable. Alkoxylated melamine is particularly preferable because a cured resin composition has good storage stability and high reactivity. Methylol melamine and alkoxylated melamine suitable for the cross-linkable compound are not particularly limited and any resin material prepared by a method disclosed in the following document can be used: "Purasutikku Zairyou Kouza [8] Yuria-Meramin Jusi" published by The Nikkan Kogyo Shimbun, Ltd. Examples of the urea compound include urea, polymethylol urea, alkoxylated methylurea that is a derivative of polymethylol urea, methylol uron having a uron ring, and alkoxylated methyluron. For those urea derivatives, resin materials disclosed in the above document can be used.

The amount of the cross-linkable compound is 70 parts or less, preferably three to 50 parts, and more preferably five to 30 parts with respect to 100 parts of the fluorine-containing copolymer on a weight basis. When the amount of the cross-linkable compound is less than three parts by weight, a thin-film formed by a coating process and then cured has low durability in some cases. In contrast, when the amount is more than 70 parts by weight, the fluorine-containing copolymer cannot be substantially prevented from forming a gel and a cured layer cannot have low refractive index and is brittle in some cases.

In order to enhance the scratch resistance, the resin layer (d) preferably contains fine silica particles, a silane coupling agent, and/or a fluorine resin with an alkoxysilyl group.

The fine silica particles preferably contain dry-process silica, wet-process silica, or colloidal silica, which is particularly preferable.

The fine silica particles usually have an average primary particle size of 0.001 to 0.2 μm and preferably 0.005 to 0.15 μm, the average primary particle size being defined as the spherical size determined by the BET method. When the average particle size is within the preferable range, a formed coating (the resin layer (d)) does not have low transparency and surface hardness. The fine silica particles preferably have a spherical shape or a bead shape.

The fine silica particles may be a mixture of two or more species of particles having different average particle sizes.

The fine silica particles may be surface-treated. Examples of a surface-treating process include a physical surface-treating process such as plasma discharge treatment and corona discharge treatment and a chemical surface-treating process in which a coupling agent is used. The chemical surface-treating process is preferably used. A silane coupling agent is particularly suitable for the coupling agent used in the chemical surface-treating process.

The content of a component derived from the fine silica particles is preferably 5% to 50%, more preferably 5% to 40%, and further more preferably 5% to 30% in terms of solid content. When the content of the component derived therefrom is within the preferable range, the resin layer (d) has sufficient surface hardness and satisfactory optical properties, that is, high transparency and low reflectance.

The silane coupling agent contains a compound represented by the formula $R(1)_a R(2)_b SiX_{4-(a+b)}$ or a hydrolysate of such a compound, wherein $R(1)_a$ and $R(2)_b$ independently represent a hydrocarbon group having an alkyl group, an alkenyl group, an allyl group, a halogen group, an epoxy group, an amino group, a mercapto group, a methacryloxy group, or a cyano group; X represents a hydrolyzable substituent selected from the group consisting of an alkoxyl group, an alkoxyalkoxy group, a halogen group, and an acyloxy group; a and b are independently equal to zero, one, or two; and the sum of a and b is equal to one, two, or three.

The content of a component derived from the silane coupling agent is preferably 5% to 70%, more preferably 15% to 65%, and further more preferably 20% to 60% in terms of solid content. When the content of the component derived therefrom is within the preferable range, the resin layer (d) has sufficient surface hardness and satisfactory optical properties, that is, high transparency and low reflectance.

The fluorine resin with an alkoxysilyl group contains a compound represented by the formula $R(3)_c R(4)_d SiX_{4-(c+d)}$ or a hydrolysate of such a compound, wherein $R(3)_c$ and $R(4)_d$ independently represent a hydrocarbon group having a fluorine-substituted alkyl group, alkenyl group, allyl group, methacryloxy group, or (meth)acryloyl group; X represents a hydrolyzable substituent selected from the group consisting of an alkoxyl group, an alkoxyalkoxy group, a halogen group, and an acyloxy group; c and d are independently equal to zero, one, two, or three; and the sum of a and b is equal to one, two, or three.

The content of a component derived from the fluorine resin with the alkoxysilyl group is preferably 20% to 90%, more preferably 25% to 80%, and further more preferably 30% to 70% in terms of solid content. When the content of the component derived therefrom is within the preferable range, the resin layer (d) has sufficient surface hardness and satisfactory optical properties, that is, high transparency and low reflectance.

A curing agent may be used to cure the coating solution for forming the resin layer (d). The curing agent preferably promotes the polycondensation of the silane coupling agent. Examples of the curing agent include acids. A Lewis acid is particularly preferable among the acids. Examples of the Lewis acid include metal chelates and metal alkoxides such as acetoacetoxy aluminum. The amount of the curing agent may be arbitrarily determined and usually 0.1 to 10 parts by weight with respect to 100 parts by weight of, for example, the silane coupling agent.

Various additives such as a polymerization inhibitor, an oxidation inhibitor, a dispersing agent, and a leveling agent may be used according to needs when the resin layer (d) is formed.

To allow the multilayer film to be highly transparent, the haze must be less than 3% and preferably less than 2.7%. When the haze is 3% or more, the transparency is unsatisfactory.

To allow the surface of the resin layer (d) to have high scratch resistance, the resin layer (d) must have fine irregularities on the surface. The relationship between the scratch resistance and the surface roughness due to the irregularities is presumed to be based on the mechanism below. When the irregular surface is scratched with steel wool or the like, portions of the steel wool are in contact only with the tips of protrusions of the irregular surface. Therefore, the total area of regions at which the steel wool portions are in contact with the irregular surface is extremely small; hence, the scratch resistance is high.

The arithmetic average surface roughness Ra of the resin layer (d) having the irregularities must be within a range of 0.003 to 0.025 µm. The arithmetic average surface roughness Ra preferably ranges from 0.004 to 0.022 µm and more preferably 0.004 to 0.020 µm. When the arithmetic average surface roughness Ra is above the range, the resin layer (d) has high haze, that is, the transparency thereof is low. In contrast, when the arithmetic average surface roughness Ra is below the range, the scratch resistance is low.

To form the irregularities on the surface of the resin layer (d), the following particles are preferably used: inorganic particles containing colloidal silica, dry-process silica, wet-process silica, titanium oxide, glass beads, aluminum oxide, silicon carbide, silicon nitride, or the like; fine colloidal silica particles; or other particles. The fine colloidal silica particles are particularly preferable. In particular, the fine silica particles are preferably a mixture of two or more species of particles having different sizes. When the fine silica particles are a mixture of, for example, particles having an average particle size of 0.001 to 0.02 µm and particles having an average particle size of 0.02 to 0.2 µm, the fine irregularities can be formed.

To allow the multilayer film to have a low reflective surface that is close to the resin layer (d), the surface has a reflectance of less than 2% and preferably less than 1.7%. When the reflectance is above the range, external light is apt to be reflected, that is, the multilayer film does not have a low reflective surface.

To allow the multilayer film to have such a low reflective surface that is close to the resin layer (d), the product of the refractive index and thickness of the electrically-conductive layer (c) and those of the resin layer (d) is preferably equal to a quarter of the wavelength of a target light beam (usually, a visible light beam). Therefore, the product of the thickness d and refractive index n of the electrically conductive layer (c) multiplied by four and the product of the thickness d and refractive index n of the resin layer (d) multiplied by four is preferably within a range of 380 to 780 µm respectively. Thus, the following equation (1) preferably holds:

$$n \cdot d = \lambda/4 \quad (1)$$

wherein n represents the refractive index of the electrically conductive layer (c) and the resin layer (d), d represents the thickness of the electrically conductive layer (c) and the resin layer (d), and λ represents the wavelength of a visible light beam and is usually within a range of 380 to 780 µm.

In order to allow the multilayer film to have low reflectance, the electrically conductive layer (c) preferably has a thickness of 0.01 to 1.0 µm and more preferably 0.06 to 0.12 µm. Furthermore, the resin layer (d) preferably has a thickness of 0.01 to 1.0 µm and more preferably 0.07 to 0.12 µm. When the thickness of the electrically conductive layer (c) and that of the resin layer (d) are outside the respective ranges described above, equation (1) does not hold and the surface of the multilayer film that is close to the resin layer (d) does not have low refractive index.

Furthermore, to allow the surface of the multilayer film that is close to the resin layer (d) to have low refractive index, the resin layer (d) preferably has a refractive index less than that of the electrically conductive layer (c). That is, the value of the following ratio is preferably less than 1.0 and more preferably 0.6 to 0.95: the ratio of the refractive index of the resin layer (d) to that of the electrically conductive layer (c). The resin layer (d) preferably has a refractive index of 1.47 or less and more preferably 1.35 to 1.45. Resin with a refractive index of less than 1.35 cannot be substantially prepared by a current method. When the refractive index is more than 1.47, the reflectance is extremely high.

A method for manufacturing the multilayer film will now be described.

The multilayer film can be manufactured by providing the hard coat layer (b) containing the (meth)acrylate compound, the electrically conductive layer (c) containing the electrically conductive particles, and the resin layer (d) containing the fluorine compound on at least one face of the substrate film (a).

The electrically conductive layer (c) can be formed according to the following procedure: a coating solution containing components, which dispersed in solvent, for forming the electrically conductive layer (c) is prepared and then applied onto the substrate film (a), and the obtained coating is dried and then cured. The resin layer (d) can be formed according to the same procedure as the above.

The solvent used to form the electrically conductive layer (c) is necessary to facilitate the applying operation or printing operation of the composition and necessary to enhance the particle dispersion. Various well-known organic solvents in which the binder component (A) can be dissolved can be used. The solvent preferably has a boiling point of 60° C. to 180° C. in view of the viscosity stability of and drying properties of the composition. Furthermore, the solvent preferably contains an oxygen atom because of the high affinity to metal particles. Preferable examples of the solvent include methanol, ethanol, isopropyl alcohol, n-butanol, tert-butanol, ethylene glycol monomethyl ether, 1-methoxy-2-propanol, propylene glycol monomethyl ether, cyclohexanone, butyl acetate, isopropyl acetone, methyl ethyl ketone, methyl isobutyl ketone, diacetylacetone, and acetylacetone. Those may be used alone or in combination.

The content of the organic solvent may be arbitrarily determined depending on the coating method and/or the printing method such that a suitable viscosity can be achieved. The content thereof is usually determined such that the content of solids in the composition is 60% or less and preferably 50% by on a weight basis. In usual, the binder component (A) is dissolved in the organic solvent; the particles (B) are added to the resulting solvent and then dispersed therein with a dispersing apparatus such as a paint shaker, a ball mill, a sand mill, a three roll mill, an attritor, or a homo-mixer; and a photopolymerization initiator (C) is added to the dispersion and then uniformly dissolved therein.

The resin layer (d) is preferably formed according to the following procedure: a solution is prepared by dispersing the curable composition principally containing the fluorine compound in a solvent and a coating is formed using the solution, dried, and then cured, wherein the solvent contains at least one selected from the group consisting of methanol, ethanol, isopropyl alcohol, n-butanol, tert-butanol, ethylene glycol monomethyl ether, 1-methoxy-2-propanol, propylene glycol monomethyl ether, cyclohexanone, butyl acetate, isopropyl acetone, methyl ethyl ketone, methyl isobutyl ketone, diacetylacetone, and acetylacetone.

In the above operation, the content of the solvent may be arbitrarily varied depending on the target viscosity of the composition, the target thickness of the cured coating, and drying conditions.

The multilayer film preferably has a multilayer structure in which the hard coat layer (b) containing the (meth)acrylate compound, the electrically conductive layer (c) containing the electrically conductive particles, and the resin layer (d) containing the fluorine compound are disposed on at least one face of the substrate film (a). In another embodiment, the multilayer film may have another multilayer structure in which electrically conductive layers (c) are each placed on the upper and lower faces of a substrate film (a). In this embodiment, a resin layer (d) is preferably placed on at least one of the electrically conductive layers (c). Alternatively, the multilayer film may have another multilayer structure in which a plurality of electrically conductive layers (c) are arranged on a face of a substrate film (a), and in this case, a plurality of resin layers (d) are preferably arranged on the top of the electrically conductive layers (c). Alternatively, an undercoat and/or an electrically conductive layer (c) may be placed on a face of a substrate film (a) that is opposite to a face having a hard coat layer (b) thereon. Alternatively, a moisture-proof layer and/or a protective layer may be placed on a resin layer (d). In order to avoid the deterioration of a reflection-preventing function, the moisture-proof layer and the protective layer preferably have a thickness of less than 20 μm.

The display film includes the multilayer film, a sticky layer or adhesive layer placed on a face of the multilayer film that is opposite to the resin layer (d), and a protective layer joined to the sticky layer or the adhesive layer.

The sticky layer and the adhesive layer are not particularly limited and any layer having a function of joining two objects with its sticky or adhesive force can be used. Examples of a sticky agent for forming the sticky layer or an adhesive agent for forming the adhesive layer include a rubber-based, a vinyl polymer-based, a polycondensation polymer-based, a thermosetting resin-based, and a silicone-based sticky or adhesive agent. Examples of the rubber-based sticky or adhesive agent include a butadiene-styrene copolymer (SBR)-based, a butadiene-acrylonitrile copolymer (NBR)-based, a polychloroprene-based, and an isobutylene-isoprene copolymer (butyl rubber)-based sticky or adhesive agent. Examples of the vinyl polymer-based sticky or adhesive agent include an acrylic resin-based, a styrene resin-based, an ethylene-vinyl acetate copolymer-based, and a vinylene chloride-vinyl acetate copolymer-based sticky or adhesive agent. Examples of the polycondensation polymer-based sticky or adhesive agent include a polyester-based sticky or adhesive agent. Examples of the thermosetting resin-based sticky or adhesive agent include an epoxy resin-based, a urethane resin-based, and a formalin resin-based sticky or adhesive agent. Those resins may be used alone or in combination.

The sticky or adhesive agent may contain a solvent or need not contain any solvent. The sticky or adhesive layer is formed by an ordinary method such as a coating method using the sticky or adhesive agent. The sticky or adhesive layer may contain a coloring agent. Such a purpose can be readily achieved by mixing the sticky or adhesive agent with a coloring agent containing a colorant such as pigment or dye. When the sticky or adhesive layer contains the coloring agent, the multilayer film preferably has a transmittance of 40% to 80% at a wavelength of 550 nm. When the multilayer film is used as a component of a filter for plasma displays, transmitted light must be neutral gray or blue gray and the color purity and color contrast of displays must be high. Such requirements are satisfied by the use of the sticky or adhesive layer containing the colorant.

A resin for forming the protective layer is not particularly limited and can be arbitrarily selected from resins for forming known plastic films. Examples of the resin for forming the protective layer include a polymer or copolymer containing one selected from the group consisting of an ester, ethylene, propylene, a diacetate, a triacetate, styrene, a carbonate, methylpentene, a sulfone, ether ethyl ketone, a nylon, an acrylate, and an aliphatic olefin.

The following polymer or copolymer is preferable among those resins: the polymer or copolymer containing one selected from the group consisting of an ethylenic polymer such as polyethylene, a propylenic polymer such as polypropylene, and a polyester such as polyethylene terephthalate. In particular, the substrate film preferably contains polyester in view of transparency and mechanical properties.

The display filter is prepared by joining the sticky or adhesive layer of the display film to a screen and/or front panel of a display unit such as a liquid crystal display (LCD), a plasma display panel (PDP), an electroluminescent display (ELD); a cathode ray tube (CRT), or a portable digital assistant (PDA).

A display can be prepared by joining the sticky or adhesive layer of the display film to a screen of a display unit such as a liquid crystal display (LCD), a plasma display panel (PDP), an electroluminescent display (ELD), a cathode ray tube (CRT), or a portable digital assistant (PDA).

The display filter of the present invention is prepared by joining the sticky or adhesive layer of the display film to a screen and/or front panel of a display unit such as a liquid crystal display (LCD), a plasma display panel (PDP), an electroluminescent display (ELD); a cathode ray tube (CRT), or a portable digital assistant (PDA).

A display can be prepared by joining the sticky or adhesive layer of the display film of the present invention to a screen of a display unit such as a liquid crystal display (LCD), a plasma display panel (PDP), an electroluminescent display (ELD), a cathode ray tube (CRT), or a portable digital assistant (PDA).

A procedure for joining the multilayer film, prepared as described above, to the display screen and/or front panel is not particularly limited. The display filter or display including the multilayer film can be prepared according to the following procedure: for example, the sticky or adhesive layer is provided on a display member or the substrate film (a) by a coating process, dried, and then joined to the display screen and/or front panel with a press roller such that the resin layer (d) is positioned at the top of the multilayer film.

Figure 2:
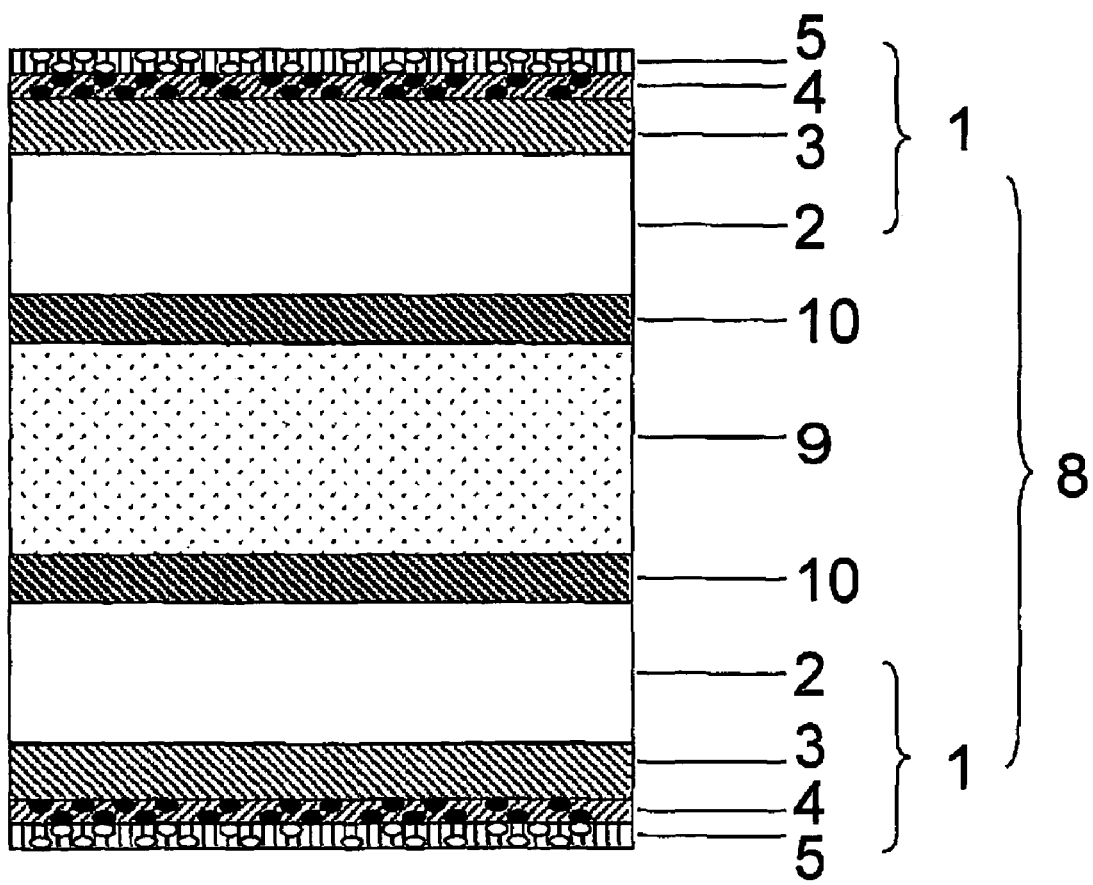
FIG. 2 is an illustration showing a PDP front panel including the multilayer film.

A plasma display panel front protector panel (PDP front panel) according to an embodiment including the multilayer film will now be described with reference to a drawing. Our disclosure is not limited to this embodiment. FIG. 2 is a schematic sectional view showing the PDP front panel. Multilayer films 1 each include corresponding substrate films 2 and sticky or adhesive layers 10 placed on the respective substrate films 2. A transparent substrate 9 made of glass, an acrylic resin, or polycarbonate is placed between the multilayer films 1 in a laminated manner.

A layer such as an electromagnetic wave-shielding layer, an infrared radiation-shielding layer, or an ultraviolet radiation-shielding layer may be placed between the transparent substrate 9 and the adhesive layers 10.

An evaluation method and a measuring method used will now be described.

[Evaluation of Steel Wool Hardness]

Samples were scratched with a piece of #0000 steel wool in such a manner that a load of 250 gf/cm² was applied to the steel wool piece, which was allowed to shuttle back and forth ten times, and the number of scratches was counted. The hardness was categorized into five levels depending on the severity of damage (the hardness of a sample with no scratches is represented by Level 5, that of a sample with one to five scratches is represented by Level 4, that of a sample with five to ten scratches is represented by Level 3, that of a sample with ten scratches or more is represented by Level 2, and that of a sample covered with scratches is represented by Level 1).

[Measurement of Haze]

Measurement was performed with a direct-reading haze computer manufactured by Suga Test Instruments Co., Ltd.

[Evaluation of Surface Resistivity (Antistatic Property)]

The surface resistivity was determined with an instrument, HIRESTA, manufactured by Mitsubishi Yuka.

[Measurement of Reflectance]

Measurement was performed with a spectrophotometer, U-3410, manufactured by Hitachi Instruments Inc. The rear surfaces of sample films were entirely scratched with a sheet of #320 or #400 waterproof sandpaper. Black paint was applied onto the resulting rear surfaces, whereby light was completely prevented from being reflected by the rear surfaces. Light was applied to the surface of a resin layer (d) at an incident angle of six to ten degrees. The reflectance was herein defined as a minimum value determined by applying light beams with wavelengths λ within a range of 380 to 780 nm.

[Measurement of Average Surface Roughness]

Surfaces of the films were observed with an atomic force microscope manufactured by Digital Instruments Inc., whereby the surface roughness was determined.

EXAMPLES

Selected films will now be further described in detail with examples and comparative examples. In the description below, the unit "part" and the unit "%" are on a weight basis unless otherwise specified.

FIG. 1 is a schematic plan view showing a multilayer film. The multilayer film 1 includes a substrate film 2, a hard coat layer 3, an electrically conductive layer 4, and a resin layer 5, those layers being arranged on the substrate film 2.

Example 1

A multilayer film having the configuration shown in FIG. 1 was prepared according to the procedure below.

[Formation of Hard Coat Layer 3]

A multifunctional acrylic resin-containing paint (KZ7224, manufactured by JSR Corporation) having a solid content of 50% was applied onto a polyester film (Lumirror, manufactured by Toray Industries Inc.) having a thickness of 188 μm with a roll coater. The coating was dried at 80° C. and then cured by applying ultraviolet light thereto at a dose of 1.0 J/cm² whereby a hard coat layer 3 having a thickness of about 10.0 μm was formed.

[Formation of Electrically Conductive Layer 4]

Three parts of the following paint was dissolved in a solvent mixture consisting of ten parts of n-butyl alcohol and seven parts of isopropyl alcohol: paint (EI-3, manufactured by Dainippon Toryo Co., Ltd.), containing indium tin oxide (ITO) particles having an average primary particle size of 30 nm, having a solid content of 35.7% and a multifunctional urethane (meth)acrylate-to-ITO particle ratio of 18:82. The resulting mixture was mixed, whereby a coating solution was prepared. The coating solution was applied onto the hard coat layer 3 with a gravure coater. The coating was dried at 80° C. and then cured by applying ultraviolet light thereto at a dose of 1.0 J/cm², whereby an electrically conductive layer 4 having a thickness of about 0.1 μm and a refractive index n of 1.682 was formed.

[Formation of Resin Layer 5]

A coating solution was prepared by mixing the following paint and solutions: 40 parts of paint (JN-7215, manufactured by JSR Corporation), containing a fluorine-containing copolymer (a fluoro olefin-vinyl ether copolymer), having a solid content of 3%; one part of a colloidal silica dispersion (an average primary particle size of 13 nm, a solid content of 30%, and a methyl isobutyl ketone dispersion medium); and 0.1 parts of a colloidal silica dispersion (an average primary particle size of 100 nm, a solid content of 30%, and a methyl isobutyl ketone dispersion medium). The coating solution was applied onto the electrically conductive layer 4 with a gravure coater. The coating was dried at 150° C. and then cured, thereby forming a resin layer 5 having a thickness of about 0.1 µm and a refractive index n of 1.42 to prepare the multilayer film having the multilayer structure shown in FIG. 1.

The resin layer 5 of the obtained multilayer film 1 was measured for reflectance, surface resistivity, and steel wool hardness. Obtained results are shown in Table 1.

TABLE 1

| | Surface resistivity Ω/square | Surface Roughness µm | Steel Wool Hardness | Haze % | Reflectance % |
|---|---|---|---|---|---|
| Example 1 | $10^7$ | 0.0069 | 4 | 1.8 | 0.8 |
| Example 2 | $10^7$ | 0.0068 | 4 | 1.9 | 0.8 |
| Example 3 | $10^7$ | 0.0068 | 5 | 1.7 | 1.0 |
| Example 4 | $10^8$ | 0.0069 | 5 | 1.8 | 1.0 |
| Comparative Example 1 | $10^7$ | 0.0400 | 4 | 6.0 | 1.5 |
| Comparative Example 2 | $10^7$ | 0.0018 | 1–2 | 1.8 | 0.8 |
| Comparative Example 3 | $10^{10}$ | 0.0069 | 1 | 6.0 | 2.0 |
| Example 5 | $10^7$ | 0.0069 | 4 | 1.8 | 0.8 |

Example 2

A multilayer film having the configuration shown in FIG. 1 was prepared as described below. A substrate film 2, a hard coat layer 3, and an electrically conductive layer 4 were formed in the same manner as described in Example 1. A coating solution was prepared by mixing the following paint and solutions: 40 parts of paint (JN-7215, manufactured by JSR Corporation), containing a fluorine-containing copolymer (a fluoro olefin-vinyl ether copolymer), having a solid content of 3%; one part of a colloidal silica dispersion (an average primary particle size of 13 nm, a solid content of 30%, and a methyl isobutyl ketone dispersion medium); and 0.1 parts of a colloidal silica dispersion (an average primary particle size of 50 nm, a solid content of 30%, and a methyl isobutyl ketone dispersion medium). The coating solution was applied onto the electrically conductive layer 4 with a gravure coater. The coating was dried at 150° C. and then cured, whereby a resin layer 5 having a thickness of about 0.1 µm and a refractive index n of 1.42 was formed. Evaluation results are shown in Table 1.

Example 3

A coating solution was prepared by mixing the following components: 13 parts of a colloidal silica dispersion (an average primary particle size of 13 nm, a solid content of 30%, and an isopropyl alcohol dispersion medium), three parts of a colloidal silica dispersion (an average primary particle size of 50 nm, a solid content of 30%, and a methyl isobutyl ketone dispersion medium), eleven parts of a silane coupling agent (tetraethoxysilane and a solid content of 100%), 27.28 parts of a fluorine resin (KBM7803, manufactured by Shin-Etsu Chemical Co., Ltd.) having an alkoxysilyl group, 6.82 parts of methanol, 2.25 parts of 0.01N hydrochloric acid, 0.2 parts of acetoacetoxy aluminum, and 230 parts of isopropyl alcohol. The coating solution was left at room temperature for 24 hours and then applied onto a electrically conductive layer 4 with a gravure coater. The coating was dried at 150° C. and then cured, thereby forming a resin layer 5 having a thickness of about 0.1 µm and a refractive index n of 1.42 to prepare a multilayer film having the multilayer structure shown in FIG. 1.

Example 4

A multilayer film having the configuration shown in FIG. 1 was prepared as described below. A substrate film 2 and a hard coat layer 3 were formed in the same manner as described in Example 1. A coating solution was prepared by mixing the following solvent and paint: seven parts of methyl isobutyl ketone and three parts of paint (TU-4005, manufactured by JSR Corporation), dissolved therein, containing antimony tin oxide (ATO) particles, having a solid content of 10% and a multifunctional urethane (meth)acrylate-to-ATO particle ratio. The coating solution was applied onto the substrate film 2 with a gravure coater. The coating was dried at 80° C. and then cured by applying ultraviolet light thereto at a dose of 1.0 J/cm$^2$, whereby an electrically conductive layer 4 having a thickness of about 0.1 µm and a refractive index n of 1.65 was formed. A resin layer 5 was formed on the electrically conductive layer 4 with a gravure coater in the same manner as that described in Example 3. Evaluation results are shown in Table 1.

Comparative Example 1

A multilayer film having the configuration shown in FIG. 1 was prepared as described below. A substrate film 2, a hard coat layer 3, and an electrically conductive layer 4 were formed in the same manner as described in Example 1. A coating solution was prepared by mixing the following paint and particles: 40 parts of paint (JN-7215, manufactured by JSR Corporation), containing a fluorine-containing copolymer (a fluoro-olefin-vinyl ether copolymer), having a solid content of 3% and 0.3 parts of silica particles (an average primary particle size of 1.4 µm). The coating solution was applied onto the electrically conductive layer 4 with a gravure coater. The coating was dried at 150° C. and then cured, whereby a resin layer 5 having a thickness of about 0.1 µm and a refractive index n of 1.42 was formed. Evaluation results are shown in Table 1.

Comparative Example 2

A multilayer film having the configuration shown in FIG. 1 was prepared as described below. A substrate film 2, a hard coat layer 3, and an electrically conductive layer 4 were formed in the same manner as described in Example 1. The following paint was applied onto the electrically conductive layer 4 with a gravure coater: 40 parts of paint (JN-7215, manufactured by JSR Corporation), containing a fluorine-containing copolymer (a fluoro olefin-vinyl ether copolymer), having a solid content of 3%. The coating was dried at 150° C. and then cured, whereby a resin layer 5 having a thickness of about 0.1 µm and a refractive index n of 1.42 was formed. Evaluation results are shown in Table 1.

Comparative Example 3

A multilayer film having the configuration shown in FIG. 1 was prepared as described below. A substrate film 2 and a hard coat layer 3 were formed in the same manner as described in Example 1. A coating solution was prepared by mixing the following sol and solvents: 23 parts of ITO sol (an average primary particle size of 30 nm, a solid content of 30%, and a methyl ethyl ketone dispersion medium), 0.5 parts of 2-methyl-1-[4-methylthiophenyl]-2-morpholinopropane-1-one, and 310 parts of 1-methoxy-2-propanol. The coating solution was applied onto the hard coat layer 3 with a gravure coater. The coating was dried at 80° C. and then cured by applying ultraviolet light thereto, whereby an electrically conductive layer 4 having a thickness of about 0.1 μm and a refractive index n of 2.0 was formed. A resin layer 5 was formed on the electrically conductive layer 4 with a gravure coater in the same manner as that described in Example 1. Evaluation results are shown in Table 1.

Example 5

In order to join a sheet of glass to the multilayer film prepared in Example 1, an adhesive, AGR-100, manufactured by Nippon Kayaku Co., Ltd. was provided on a face of the multilayer film that is opposite to the resin layer (d). The glass sheet was joined to the multilayer film with the adhesive placed therebetween and the adhesive was cured by applying UV light thereto at a dose of 1,000 mJ/cm². Evaluation results are shown in Table 1.

For all evaluation items, the multilayer films of Examples 1 to 5 exhibit good results. In contrast, the multilayer film of Comparative Example 1 has unsatisfactory transparency and reflection-preventing properties because the silica particles contained in the resin layer have an extremely large particle size and the multilayer film therefore has high average surface roughness. The multilayer film of Comparative Example 2 has unsatisfactory steel wool hardness because the resin layer contains no silica particles and the surface therefore has no irregularities. The multilayer film of Comparative Example 3 has unsatisfactory steel wool hardness because the electrically conductive layer contains no acrylic resin and therefore has a low degree of cure.

Example 6

In order to join multilayer films prepared in the same manner as that described in Example 1 to both faces of a sheet of glass, an adhesive containing a colorant having an absorption peak at a wavelength of 595 nm and a colorant for correcting the chromaticity of white light was applied onto the surfaces of substrate films (a). The multilayer films were joined to the glass sheet with the adhesive, whereby a front protector panel for plasma display panels was prepared.

Example 7

The plasma display panel front protector panel prepared in Example 6 was set on the front face of a plasma display panel, whereby a plasma display for displaying a good image with low reflection was prepared.

INDUSTRIAL APPLICABILITY

A multilayer film has low surface reflectance and high scratch resistance that are properties suitable for antireflective films. Since the multilayer film has satisfactory antistatic properties and high flexibility, the multilayer film is preferably placed on the front face of a display to prevent reflection.

The invention claimed is:
1. A multilayer film comprising:
   a substrate film (a),
   a hard coat layer (b) containing a (meth)acrylate compound,
   an electrically conductive layer (c) having a thickness of 0.06 to 0.12 μm and containing 70% to 90% by weight of electrically conductive particles, and
   a resin layer (d) having a thickness of 0.01 to 1.0 μm and containing a fluorine-containing copolymer having a vinyl ether in principal chain and silica particles with a particle size of 0.001 μm to 0.2 μm in two or more particle size distributions,
   the layers being disposed on at least one face of the substrate film (a), wherein the resin layer (d) has fine irregularities on the surface and an arithmetic average surface roughness Ra ranging from 0.004 μm to 0.020 μm and the surface of the resin layer (d) of the multilayer film has a reflectance of less than 2%.

2. The multilayer film according to claim 1, wherein the haze of the multilayer film is less than 3%.

3. The multilayer film according to claim 1, wherein the substrate film (a) contains a polymer containing one selected from the group consisting of an ester, an olefin, an acetate, styrene, a carbonate, a sulfone, ether ethyl ketone, an imide, fluorine, a nylon, an acrylate, and an aliphatic olefin.

4. The multilayer film according to claim 3, wherein the substrate film (a) contains a polymer containing one selected from the group consisting of the ester, the acetate, and the acrylate.

5. The multilayer film according to claim 1, wherein the electrically conductive particles of the electrically conductive layer (c) contain a metal oxide.

6. The multilayer film according to claim 1, wherein the resin layer (d) contains a silane coupling agent represented by the formula $R(1)_a R(2)_b SiX_{4-(a+b)}$, or a hydrolysate of the agent, or a product obtained by subjecting the hydrolysate to reaction, wherein $R(1)$ and $R(2)$ independently represent a hydrocarbon group having an alkyl group, an alkenyl group, an allyl group, a halogen group, an epoxy group, an amino group, a mercapto group, a methacryloxy group, or a cyano group, X represents a hydrolyzable substituent selected from the group consisting of an alkoxyl group, an alkoxyalkoxy group, a halogen group, and an acyloxy group, a and b are independently equal to zero, one, or two, and the sum of a and b is equal to one, two, or three.

7. The multilayer film according to claim 1, wherein the fluorine compound contained in the resin layer (d) has an alkoxysilyl group.

8. A display film including the multilayer film according to claim 1.

9. A display including the multilayer film according to claim 8.

10. A display filter including the multilayer film according to claim 1.

11. A front protector panel, including the display filter according to claim 10, for plasma display panels.

12. A plasma display including the front protector panel for plasma display panels according to claim 11.

13. The multilayer film according to claim 1, further comprising a cross-linkable compound in the resin layer (d).

14. The multilayer film according to claim 1, wherein the fluorine-containing copolymer contains a fluorine-containing olefin chain with a fluorine content of 30% or more.

15. The multilayer film according to claim 14, wherein the fluorine-containing copolymer contains 20% to 70% of a repeating unit derived from the fluorine-containing olefin compound.

16. The multilayer film according to claim 1, wherein the fluorine-containing copolymer contains 10% to 70% of a repeating unit derived from the vinyl ether-containing compound.

* * * * *